US006565643B2

(12) United States Patent
Nieman et al.

(10) Patent No.: US 6,565,643 B2
(45) Date of Patent: May 20, 2003

(54) PROCESS FOR PREPARING SYNTHETIC CLAY MINERALS

(75) Inventors: Jan Nieman, Maarssenbroek (NL); Stephan Janbroers, Almere (NL)

(73) Assignee: Akzo Nobel N.V., Arnhem (NL)

( * ) Notice: Subject to any disclaimer, the term of this patent is extended or adjusted under 35 U.S.C. 154(b) by 104 days.

(21) Appl. No.: 09/747,284

(22) Filed: Dec. 21, 2000

(65) Prior Publication Data

US 2001/0036435 A1 Nov. 1, 2001

Related U.S. Application Data

(60) Provisional application No. 60/178,209, filed on Jan. 26, 2000.

(30) Foreign Application Priority Data

Dec. 22, 1999 (EP) .............................................. 99204465

(51) Int. Cl.[7] .............................................. C04B 14/04
(52) U.S. Cl. ........................ 106/486; 423/325; 423/326; 423/327; 423/328; 423/329.1; 423/330.1
(58) Field of Search ................................ 423/325, 326, 423/327, 328, 329.1, 330.1; 106/486

(56) References Cited

U.S. PATENT DOCUMENTS

| 3,803,026 A |   | 4/1974  | Jaffe ........................... 208/111    |
| 3,844,979 A | * | 10/1974 | Hickson ................ 208/111.25          |
| 3,855,147 A | * | 12/1974 | Granquist ................. 106/286.2        |
| 4,749,676 A | * | 6/1988  | Blumenthal et al. ......... 423/326          |

FOREIGN PATENT DOCUMENTS

| EP | 0 605 044 A1 | 6/1994 | ........... C01B/33/40 |
| WO | WO 96/07477  | 3/1996 | ............ B01J/21/16 |
| WO | WO 96/07613  | 3/1996 | ............ C01B/33/40 |
| WO | WO 00/00286  | 1/2000 | ............ B01J/37/03 |

OTHER PUBLICATIONS

C. R. Acad. Sc. Paris, t. 292 (Jan. 5, 1981) Serie II 61–64.

* cited by examiner

*Primary Examiner*—C. Melissa Koslow
*Assistant Examiner*—Shalie Manlove
(74) *Attorney, Agent, or Firm*—Louis A. Morris

(57) ABSTRACT

The invention pertains to a process for preparing a synthetic clay mineral which comprises silicon, aluminum, and at least one octahedron ion, which clay mineral has a total content of sodium and potassium of less than 0.5 wt. %, comprising the steps of a) providing a silica-alumina with a total content of sodium and potassium of less than 2.0 wt. % b) combining the silica-alumina with an octahedron ion source in such a manner that less than 0.1 mole of the total of sodium or potassium is added per mole of octahedron ion, c) if necessary, adjusting the pH to a value of at least 7, with less than 0.1 mole of the total of sodium and potassium being added per mole of octahedron ion during the pH adjustment, d) ageing the precipitate formed in c) at a temperature of 0–350° C. in an aqueous environment;

e) optionally isolating the resulting material, optionally followed by washing.

The invention makes it possible to prepare a saponite with a low content of sodium and potassium without an ion-exchange on the final material being necessary.

8 Claims, No Drawings

PROCESS FOR PREPARING SYNTHETIC CLAY MINERALS

CROSS REFERENCE TO RELATED APPLICATION

This application claims priority from European Application Serial No.: EP99204465.1, filed Dec. 22, 1999 and U.S. Provisional Patent Application Ser. No. 60/178,209, filed on Jan. 26, 2000, the entire content of which is incorporated by reference herein.

BACKGROUND OF THE INVENTION

1. Field of the Invention

The present invention relates to a process for preparing synthetic clay minerals.

2. Prior Art

U.S. Pat. No. 3,803,026 describes a process for preparing a clay-type material in which an amorphous gel comprising silicon oxide, aluminum oxide, and, e.g., magnesium oxide is subjected to a high-temperature ageing step in an autoclave.

C.R. Acad. Sc. Paris 7 292 describes a process for preparing, int. al., clays comprising aluminum, silicon, and, e.g., magnesium by way of a co-precipitation process.

EP 0 605 044 describes a process in which a glass type material, e.g., boron glass is reacted with a source of layered ions, e.g., aluminum or magnesium.

The use of synthetic clay minerals as cracking component in catalytic applications is described, e.g., in WO 96/07477. There, catalysts are disclosed which at least comprise a hydrogenation metal component and a swelling synthetic clay composed of clay platelets having an average diameter not exceeding 1 μm and an average degree of stacking not exceeding 20 sheets per stack. This reference refers to the synthetic clays of WO 96/07613 as being particularly attractive for use in catalytic applications, particularly in hydroprocessing, in view of their small particle size and low degree of stacking, which is accompanied by a large surface area and high accessibility.

In WO 96/07613 mentioned above, the synthetic clay minerals are prepared by bringing the pH of an aqueous liquid containing precursors for the clay to be prepared to a value of 3–9 and the temperature of the liquid to a value of from 60° to 350° C. The resulting clays have a crystalline structure with distinct peaks in the X-ray diffraction pattern at about $2\Theta=20°$, $2\Theta=35°$, and $2\Theta=60°$. They are made up of elementary three-layer platelets with dimensions from 0.01 μm to 1 μm, which are optionally stacked to up to 20 platelets. One particular example of such a clay material is a saponite, which, as indicated above, is a clay in which the tetravalent silicon ions of the tetrahedron layers are at least partly replaced by trivalent aluminum ions and in which the octahedral layer contains divalent ions almost exclusively.

The clay minerals prepared in accordance with WO 96/07613 typically have a sodium content of more than 0.5 wt. %. This is too high to be acceptable in hydroprocessing, and therefore the clay minerals need to be subjected to the ion exchange described above. A disadvantage of the clay minerals prepared in accordance with this reference is their poor filterability, which typically is above 2000 seconds (s), expressed as normalised filtration time. Because of this low filterability, the ion exchange takes a long time and so is difficult to perform on a commercial scale. Therefore there is need for a process to prepare synthetic clay minerals with a small platelet size and a low degree of stacking in which the problem of low filterability in effecting the ion exchange is circumvented.

SUMMARY OF THE INVENTION

The present invention fulfils the above need by providing a process which comprises the steps of a) providing a silica-alumina with a total content of sodium and potassium of less than 2.0 wt. % b) combining the silica-alumina with an octahedron ion source in such a manner that less than 0.1 mole of the total of sodium or potassium is added per mole of octahedron ion, c) if necessary, adjusting the pH to a value of at least 7, with less than 0.1 mole of the total of sodium and potassium being added per mole of octahedron ion during the pH adjustment, d) ageing the precipitate formed in c) at a temperature of 0–350° C. in an aqueous environment e) optionally isolating the resulting material, optionally followed by washing.

Other embodiments of the present invention encompass further details relating to the synthetic clay mineral preparation process, including further ingredients in the composition and further details concerning the process for preparation, all of which are hereinafter disclosed in the following discussion of each of those facets of the invention.

DETAILED DISCRIPTION OF THE INVENTION

Clays minerals are layered silicates, also known as phyllosilicates. The individual clay platelets are composed of a central layer of octahedrally coordinated metal ions interlinked by oxygen ions. On either side of this so-called octahedral layer there are so-called tetrahedral layers composed of tetrahedrally coordinated metal ions linked to one another and to the octahedral layer by oxygen atoms. The metal ions in the tetrahedral layers are tetravalent. The metal ions in the octahedral layer can be trivalent or divalent. Two types of octahedral layers exist, namely the trioctahedral layer, in which all octahedral sites are filled with divalent cations, and the dioctahedral layer, in which two thirds of the octahedral sites are filled with trivalent cations and one third of the octahedral sites remain unfilled.

The above-described structure is electroneutral. However, if the structure comprises lower valency cations at the location of the tetravalent tetrahedral ions or the tri- or divalent octahedral ions, the clay platelet is negatively charged. This phenomenon is known as isomorphous substitution. For instance, in a dioctahedral layer divalent metal ions such as magnesium, zinc, or nickel may be present instead of trivalent metal ions such as aluminum. Materials with such a structure are called montmorillonites. Alternatively, in a trioctahedral layer monovalent metal ions such as lithium may be present instead of divalent metal ions such as magnesium or zinc. Materials with such a structure are called hectorites. In the tetrahedral layer trivalent metal ions, e.g., aluminum atoms, may be present instead of the tetravalent ions, generally silicon. In the case of a clay with a trioctahedral layer this material is called saponite, for a clay with a dioctahedral layer this material is called beidellite.

The negative charge resulting from isomorphous substitution is counterbalanced by the presence of cations, also known as counter-ions, in the space between the clay platelets. These counter-ions often are sodium or potassium. It is because of the negative charge caused by isomorphous substitution that clays can be advantageous for use in catalysis, since it gives them the potential to function as solid acids. However, to be able to function as solid acids, it is essential that the clay minerals comprise Brønsted acid groups, since these are at least partially responsible for the cracking ability of these compounds. Brønsted acid sites can be achieved by replacing the non-hydrolyzable counter-ions such as sodium or potassium with ammonium ions and then heating the whole. This process will result in ammonia desorption, leaving a proton to form a Brønsted site. Brønsted sites can also be introduced by replacing the counter-ions with hydrolyzable metal ions. Hydrolysis will then give hydrogen ions.

By the process of the present invention a clay material can be obtained which has a total content of sodium and potassium of below 0.5 wt. %. Therefore, it is not necessary to subject it to an ion exchange step. This is advantageous, because, as indicated above, carrying out an ion exchange on the final clay material is not attractive in view of its high normalised filtration time.

In the process of the present invention, if an ion exchange is carried out, it is carried out on the silica-alumina, before addition of the octahedron ion. Silica-aluminas can be selected to have a much better filterability than the final clay materials produced by the process of this invention, and therefore carrying out the ion exchange on the silica-alumina instead of on the final clay results in a more efficient process. The process according to the invention thus makes it possible to use relatively cheap alumina and silica sources which contain substantial amounts of the total of sodium and potassium without a cation exchange of the final clay being necessary.

Incidentally, it is noted that non-pre-published international patent application PCT/EP99/05818 filed on Jun. 24, 1999, describes a process for preparing a co-gel comprising a trivalent element which may be alumina, a tetravalent element which may be silicon, and a divalent element which may, e.g., be magnesium. The co-gel may be prepared by various processes including one described in very general terms in which in a first step sources of the trivalent and tetravalent elements are mixed, optionally precipitation takes place, the precipitate is optionally isolated and washed, a source of the divalent element is added, precipitation takes place, and the resulting precipitate is isolated. It is indicated that the optionally obtained precipitate of trivalent and divalent elements may be subjected to a cation exchange. However, this reference, which is not directed to the production of clay minerals. Further, it does not mention any requirements as to the total content of sodium and potassium of the precipitate, or any requirements as to the ageing step.

The above mentioned, U.S. Pat. No. 3,803,026 does not disclose to first prepare a silica-alumina with a specified content of sodium and potassium and then add an octaedron ion source, as is required in the present invention.

The above mentioned C.R. Acad. Sc. Paris 7 292 does not disclose to first prepare a silica-alumina with a specified content of sodium and potassium and then add an octaedron ion source, as is required in the present invention.

The above mentioned EP 0 605 044 says nothing about the sodium or potassium content of the intermediate.

The starting material for the process of the present invention is a silica-alumina with a total content of sodium and potassium of less than 2.0 wt. %. Preferably, the total of sodium and potassium of the silica-alumina is less than 0.5 wt. %, more preferably less than 0.2 wt. %, most preferably less than 0.1 wt. %. Generally, 50% or more, preferably 70% or more, more preferably 90% or more, of the aluminum in the silica-alumina is tetrahedrally coordinated, as can be determined using $^{27}$Al-MAS-NMR.

A starting silica-alumina with the required total content of sodium and potassium can be obtained by preparing a silica-alumina from starting materials which are low in these compounds. It is also possible to use a silica-alumina with a total content of sodium and potassium of more than 2.0 wt. % and to subject this material to an ion exchange which is performed in such a way as to reduce the total of sodium and potassium present in the silica-alumina to the required value. This latter process is generally preferred because it enables the use of relatively cheap alumina and silica sources. This latter silica-alumina starting material generally has a normalised filtration time of 500 s or lower, preferably of 200 s or lower, more preferably of 100 s or lower, and most preferably of 50 s or lower.

Suitable silica-aluminas, also referred to as amorphous aluminosilicates, can be obtained commercially, but they are also easily prepared in any of the various ways known to the skilled person. A silica-alumina can, e.g., be prepared by combining an aluminum source, such as sodium aluminate or aluminum sulfate, with a silica source such as sodium silicate, potassium silicate, a silica gel, or a silica sol, and, if necessary, adjusting the pH of the mixture to a value at which precipitation occurs. Other routes include providing a heel of a silica source and subsequently dosing an alumina source at a pH at which precipitation occurs or, alternatively, adding a silica source to a heel of an alumina source. Furthermore, several combinations can be used like dosing an alumina source and a silica source simultaneously to a heel of an alumina source or a heel of a silica source. A silica source and/or an alumina source can also be added at the end of the routes described above.

The term "ion exchange" is meant to indicate any treatment by which the sodium and/or potassium ions present in the silica-alumina are replaced by ions which are the source of hydrogen ions. A cation exchange treatment can be, e.g., a cation exchange with ammonium ions or a cation exchange with hydrolyzable metal ions.

If the total content of sodium and potassium is below the required limit without an ion exchange treatment, of course an ion exchange treatment is not necessary. However, if the counter-ions of the sodium- and potassium-free silica-alumina are, e.g., metal ions with a low hydrolyzability, it may be desired to replace these metal ions partially or as a whole by hydrogen ions via, e.g., ion exchange with ammonium ions or metal ions with a higher hydrolyzability.

The silica-alumina starting material described above is combined with an octahedron ion source. In the context of the present specification the term "octahedron ion" refers to the ion intended to be incorporated into the octahedral layer of the final clay mineral. Suitable octahedron ions include divalent ions, for example divalent ions of magnesium, zinc, manganese, copper, or beryllium, or mixtures thereof, and/or divalent ions selected from the non-noble metals of Group VIII of the Periodic Table. In principle, monovalent or trivalent metal ions which the skilled person considers suitable for incorporation into a clay mineral octahedron layer may also be used, optionally in combination with divalent metal ions. Preferably, the octahedron ion comprises at least one ion selected from magnesium, cobalt, and nickel. Combinations of magnesium with cobalt and/or nickel and the use of magnesium alone are preferred. In general, it is preferred to use an octahedron ion which is not exclusively selected from the Group VIII non-noble metals.

The octahedron ion source is, for example, an aqueous solution obtained by dissolving a salt of the desired octahedron metal in water. Suitable salts include, for example, sulfates and nitrates.

To avoid an undesirable build-up from sodium and/or potassium in the clay mineral being synthesized, the addition of the octahedron ion source is accompanied by the addition of less than 0.1 mole, preferably less than 0.05 mole, more preferably less than 0.02 mole, of the total of sodium and potassium per mole of octahedron ion.

It may be preferred to ensure that during the addition of the octahedron ion source (step b) the pH does not increase to a value above 7, preferably not above 6.5, this to ensure that the octahedron ion does not precipitate in oxide form. This can easily be ensured by previously acidifying the silica-alumina.

Then, if necessary, the pH of the reaction mixture is adjusted to a value of at least 7, preferably 7–10, more preferably 8–9.5. Optimum pH values can be determined by the skilled person by simple routine experimentation. To avoid an undesirable build-up from sodium and/or potassium in the clay mineral being synthesized during the pH adjustment, less than 0.1 mole, preferably less than 0.05 mole, more preferably less than 0.02 mole, of the total of sodium and potassium is added per mole octahedron ion.

The precipitate formed above is subsequently aged in an aqueous environment to convert it at least partially into a clay mineral. Ageing can be done, e.g., for 0.5 to 120 hours at a temperature in the range of 0° C. to 350° C., preferably 0° C. to 250° C., the pH being kept at the desired value. When the desired reaction temperature is above the boiling point of the medium, the ageing is to be carried out under hydrothermal conditions, which, as will be evident to the skilled person, implies that the reaction is carried out in the liquid phase, with a suitable pressure being applied to maintain the liquid phase at the selected temperature. Generally, it is preferred to carry out the ageing at a temperature below 200° C., more preferably below 150° C., most preferably below 100° C., since it is believed that the use of higher temperatures and corresponding pressures results in the formation of material with a lower surface area. Preferred ageing conditions include a period of 2–120 hours at a temperature of 0–100° C., preferably 2–24 hours at a temperature of 60–100° C., preferably 70–100° C. It is within the scope of the skilled person to determine the optimum ageing conditions for producing synthetic clay minerals. Assuming that stoichiometric amounts of reaction components are present, one will generally produce a material with a crystallinity $C_A$ of 60% or more and a crystallinity $C_B$ of 30% or more, wherein $C_A$ and $C_B$ are determined as described in PCT/EP99/05818.

Depending on the intended further processing, the aged clay mineral can be isolated from the aqueous environment, e.g., by filtration. If so desired, the material can be washed. In this context it is noted that isolating and washing are much less intensive procedures than ammonium-exchange.

At least part of the acidity of the final clay is determined by the silica/alumina molar ratio (SAR) of the tetrahedral layer, which is in turn determined by the SAR of the silica-alumina starting material, since the silicon atoms and aluminum atoms of the silica-alumina by and large end up in the tetrahedral layer of the formed clay.

The SAR of the silica-alumina, and thus the SAR of the clay mineral, generally is at least 6, preferably at least 8. It generally is not more than 30, preferably not more than 20.

Generally, the octahedron ion is added in such an amount that the atomic ratio between the octahedron ions and the total of tri- and tetravalent metallic elements contained in the product material lies between 0.50 and 1.00, preferably between 0.60 and 0.80. As the skilled person will recognise, in a trioctahedral clay mineral the theoretical atomic ratio between octahedron ion and tetraeder ion (silica and alumina) is ¾. This means that the amount of octahedron ion added will regulate the amount of clay to be formed. If less than a stoichiometric amount of octahedron ion is added, not all silica-alumina will be converted, into clay, and a clay dispersed in a silica-alumina is formed. If more than a stoichiometric amount of octahedron ion is added, apart from clay, the corresponding octahedron ion oxide will also be formed.

For environmental reasons it may be preferred that the reaction mixture and the product obtained therefrom are substantially free from chlorine, fluorine, and heavy metals. That is, these materials are preferably present in an amount of less than 2 wt. %, more preferably less than 0.75 wt. %, most preferably less than 0.2 wt. %, calculated on the total solid product formed.

Optionally, the final clay material is subjected to a calcination step, optionally a flash-calcination step. This can be suitably done at a temperature of 350°–900° C., preferably of 400°–800° C., for a time period of generally 0.5–8 h.

The Synthetic Clay Mineral Prepared by the Process of the Present Invention

To have sufficient catalytic activity, it is essential that the clay material has a surface area of at least 300 m$^2$/g, preferably at least 350 m$^2$/g, and more preferably at least 400 m$^2$/g, as determined via the BET method (ASTM-D 3663-84).

Preferably, the clay mineral has a pore size distribution as determined by nitrogen adsorption (model Broekhof, de Boer) which meets the following requirements: PV(<60 nm) is preferably above 0.35 ml/g, more preferably above 0.5 ml/g, even more preferably above 0.7 ml/g. PV(10–60 nm) is preferably above 0.1 ml/g, more preferably above 0.2 ml/g, and even more preferably above 0.3 ml/g.

Generally, at least 55%, preferably 70% or more, of the aluminum in the final clay is tetrahedrally coordinated, as can be determined using $^{27}$Al-MAS-NMR.

High cation exchange capacities are desirable in cracking applications. The cation exchange capacity of the clay prepared by the process of the present invention generally is at least 0.5 wt. %, preferably above 1.0 wt. %, more preferably above 2.0 wt. %. Typically, the cation exchange capacity of the final clay is less than 10 wt. %, more typically less than 5 wt %.

The total content of sodium and potassium of the clay mineral produced by the process according to the invention is less than 0.5 wt. %, preferably less than 0.2 wt. %, more preferably less than 0.1 wt. %, most preferably less than 0.75 wt. %, depending on the final use of the clay mineral produced by the process according to the invention.

The average diameter of the clay platelets is not more than 1 μm, and is preferably between 1 nm and 0.5 μm, more preferably in the range of 1 nm to 0.1 μm, still more preferably in the range of 1 to 50 nm, and most preferably in the range of 1 to 20 nm. The average degree of stacking of the clay platelets is not more than 20 platelets per stack, preferably not more than 10 platelets per stack, more preferably not more than 5 platelets per stack, and most preferably not more than 3 platelets per stack. The lower limit, needless to say, is constituted by unstacked clay platelets, which have a "degree of stacking" of 1. These parameters can be determined using electron microscopy.

The size of the clay platelets is dependent on the ageing temperature and the ageing period. The higher the ageing temperature is and the longer the ageing period, the larger the clay platelets will be. The size is also dependent on the nature of the metal ions to be incorporated into the octahedral layer. If, say, zinc ions are used, the platelets obtained will be much larger than when magnesium ions are used. The degree of stacking is dependent on the ionic strength of the solution. A high ionic strength will give much-stacked structures, while a low ionic strength will generally lead to structures exhibiting little stacking.

If so desired, the clays may be pillared. This involves providing oligomers or polymers of, say, aluminum, chromium, zirconium or titanium hydrated by cation exchange between the clay platelets. Suitable pillaring processes are described, e.g., in WO 96/07613.

The materials obtained by the process according to the invention are particularly suitable for use in catalytic applications. More specifically, they are suitable for the performance of chemical reactions catalysed by a Lewis acid or a Brønsted acid. Examples of such reactions include (fluidised) hydrocarbon cracking, isomerisation, polymerisation, hydration of olefins, alkylation of aromatics, e.g., by Friedel Crafts, and dehydration of alcohols.

The materials prepared by the process according to the invention are particularly suitable for use in hydroprocessing of hydrocarbonaceous feedstocks. They can be incorporated into a hydroprocessing catalyst, which is then used in hydroprocessing as described in WO 96/07477. For a description of the catalyst composition reference is made to page 3, line 7, through page 13, line 10, particularly page 3, lines 8–17, through page 13, line 10 of this document. The preparation of the catalyst is described on page 13, line 11 through page 15, line 5. The use of the catalyst is described on page 15, line 7, through page 18, line 7. The materials prepared by the process according to the invention can also be applied in hydroprocessing in accordance with what is described for the co-gel in non-prepublished international patent application PCT/EP99/05818 mentioned above. For a description of the catalyst, reference is made to page 25, line 5, through page 27, line 29. For the preparation of the catalyst, reference is made to page 28, line 1, through page 29, line 25. For the use of the catalyst, reference is made to page 30, line 1, through page 33, line 15.

Additionally, the material produced by the process according to the invention can be used in the catalyst carrier described in non-prepublished international patent application PCT/EP99/05049, filed on Jul. 15, 1999. For the carrier composition, reference is made to page 3, line 5, through page 9, line 29, specifically page 3, lines 5–15, page 3, lines 25–30, page 8, line 14, through page 9, line 29. For the catalyst composition resulting from said carrier, reference is made to page 9, line 31, through page 10, line 31. For the use of this catalyst, reference is made to page 11, line 1, through page 12, line 7.

The cited items of the above-mentioned references are incorporated by reference into the present specification.

Determination of the Cation Exchange Capacity (CEC)

The sample is exchanged three times with a 0.2 molar NaCl solution for one hour at a temperature of 20° C. For each gram (dry base) of the sample, 100 cm$^3$ of NaCl solution is used. The pH of the solutions is not adjusted during the exchange. Subsequently, the exchanged sample is washed with water until no chloride can be detected in the wash water using a silver nitrate solution. The amount of sodium incorporated into the sample after these exchange and wash steps is determined. The cation-exchange capacity is expressed as wt % sodium in exchanged sample (dry base).

Determination of the Normalised Filtration Time NFT

The silica-alumina slurry which is to be subjected to the cation exchange step is filtered at a temperature of 60° C. at 20 cm Hg underpressure using a filter of approximately 100 cm$^2$ with a black ribbon—589 filter (commercially available at Schleicher and Schnel) to obtain a filter cake with a thickness of between 10 and 15 mm. An amount of 1.5 displacements of demineralized water with a temperature of 60° C. is gently poured onto the filter cake and filtered until the surface is just dry. This washing step is repeated twice. Then the filter cake thickness $d_1$ in mm is measured. An amount of 1.5 displacements of demineralized water with a temperature of 60° C. is filtered until the surface is just dry. The required time t in seconds for the water to be filtered through the filter cake in this last filtration step is determined.

The normalised filtration time NFT is calculated according to the following equation $$NFT = \frac{t}{1.5D^2}$$

with D being the normalised thickness of the filter cake calculated as $$D = \frac{d_1 \text{ (mm)}}{10 \text{ (mm)}}$$

Thus, in seconds the NFT corresponds to the filtration time in which 1 (volume) displacement passes through a filter cake with a normalised thickness of 10 mm.

EXAMPLE 1

An amorphous silica-alumina was prepared by co-precipitation at pH 4.5. Subsequently the material was ammonium exchanged to obtain the following characteristics:

| | |
|---|---|
| total of sodium and potassium | 0.12 wt. % |
| Surface area (BET) | 156 m$^2$/g |
| cation exchange capacity | 6.3 wt. % |
| % Al(tet) | 92% |
| Silica/alumina molar ratio | 8.4 |
| NFT | 12 s |

An amount of 23.8 g amorphous silica-alumina filter cake (8.1 g d.b.) was reslurried in 90 g water. To this slurry, a solution of 25.2 g Mg(NO$_3$)$_2$.6H$_2$O in 101 g water was added (pH 4.9). The temperature of the mixture was raised to 100° C. Subsequently, the pH was adjusted to 9 using a 10 wt. % NH$_4$OH solution. The mixture was aged at 100° C. for 20 hours in a closed polypropylene jar. The sample obtained was then filtered and washed thoroughly with demineralized water. The dried sample (120° C.) showed the following characteristics:

| | |
|---|---|
| total of sodium and potassium | 0.01 wt. % |
| surface area (BET) | 384 m$^2$/g |
| pore volume <60 nm | 0.380 ml/g |
| pore volume 10–60 nm | 0.105 ml/g |
| cation exchange capacity | 2.3 wt. % |
| silica/alumina molar ratio | 8.5 |
| magnesium/aluminum + silicon atom ratio | 0.69 |
| XRD | Magnesium saponite |

EXAMPLE 2

An amorphous silica-alumina was prepared by co-precipitation at pH 9. Subsequently the material was mildly ammonium exchanged to obtain the following characteristics:

| | |
|---|---|
| total of sodium and potassium | 1.43 wt. % |
| Surface area (BET) | 226 m²/g |
| cation exchange capacity | 5.8 wt. % |
| % Al(tet) | 100% |
| silica/alumina molar ratio | 11.1 |

An amount of 79.1 g amorphous silica-alumina filter cake (12.4 g d.b.) was reslurried in 118 g water. To this slurry, a solution of 40.6 g $Mg(NO_3)_2.6H_2O$ in 133 g water was added (pH 5.6). The temperature of the mixture was raised to 100° C. Subsequently, the pH was adjusted to 9 using a 25 wt % $NH_4OH$ solution. The mixture was aged at 100° C. for 24 hours in a closed polypropylene jar. The sample obtained was then filtered and washed with demineralized water. The dried sample (120° C.) showed the following characteristics:

| | |
|---|---|
| Total of sodium and potassium | 0.03 wt. % |
| Surface area (BET) | 571 m²/g |
| pore volume <60 nm | 0.803 ml/g |
| pore volume 10–60 nm | 0.321 ml/g |
| cation exchange capacity | 2.1 wt. % |
| silica/alumina molar ratio | 11.2 |
| Magnesium/aluminum + silicon atom ratio | 0.82 |
| XRD | Magnesium saponite and trace amount of brucite |

What is claimed is:

1. A process for preparing a synthetic clay mineral which comprises silicon, aluminium, and at least one octahedron ion, which clay mineral has a total content of sodium and potassium of less than 0.5 wt. %, comprising the steps of
   a) providing a silica-alumina with a total content of sodium and potassium of less than 2.0 wt. %;
   b) combining the silica-alumina with an octahedron ion source in such a manner that less than 0.1 mole of the total of sodium and potassium is added per mole of octahedron ion;
   c) obtaining a precipitate of octahedron ion with said silica-alumina, the pH being maintained at a value of at least 7, in such a manner that less than 0.1 mole of the total of sodium and potassium is added per mole of octahedron ion; and
   d) ageing the precipitate formed in c) at a temperature of 0–350° C. in an aqueous environment.

2. The process of claim 1 wherein the precipitate resulting from d) is isolated.

3. The process of claim 2 wherein the isolated precipitate is washed.

4. The process of claim 1 wherein the silica-alumina is provided by subjecting a silica-alumina with a total content of sodium and potassium of more than 2.0 wt. % to an ion exchange with ammonium or a hydrolizable metal ion.

5. The process of claim 1 wherein the silica-alumina is obtained by combining an aqueous solution of a silica source with an aqueous solution of an alumina source.

6. The process of claim 1 wherein in step c) the pH is adjusted by the addition of a base to a pH of 8–9.5.

7. The process of claim 1 wherein the octahedron ion comprises at least one ion selected from magnesium, zinc, manganese, copper, beryllium, and Group VIII non-noble metallic elements.

8. The process of claim 7 wherein the octahedron ion comprises at least one ion selected from magnesium, cobalt, and nickel.

* * * * *